US012007862B2

(12) United States Patent
Sunayama (10) Patent No.: US 12,007,862 B2
(45) Date of Patent: Jun. 11, 2024

(54) ERROR DETECTION DEVICE AND ERROR DETECTION METHOD USING A PATTERN SIGNAL

(71) Applicant: ANRITSU CORPORATION, Kanagawa (JP)

(72) Inventor: Ryo Sunayama, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 2 days.

(21) Appl. No.: 17/931,237

(22) Filed: Sep. 12, 2022

(65) Prior Publication Data

US 2023/0116669 A1   Apr. 13, 2023

(30) Foreign Application Priority Data

Oct. 11, 2021   (JP) .................. 2021-166870

(51) Int. Cl.
*G06F 11/27*        (2006.01)
*G06F 11/22*        (2006.01)

(52) U.S. Cl.
CPC ............ *G06F 11/27* (2013.01); *G06F 11/221* (2013.01)

(58) Field of Classification Search
CPC ............................... G06F 11/27; G06F 11/221
See application file for complete search history.

(56) References Cited

U.S. PATENT DOCUMENTS

| 5,802,073 | A  | * | 9/1998 | Platt ...................... G06F 11/221 |
| | | | | 714/E11.169 |
| 11,714,130 | B2 | * | 8/2023 | Onuma ............ G01R 31/31703 |
| | | | | 714/735 |
| 2005/0097403 | A1 | * | 5/2005 | Chen ...................... G06F 11/221 |
| | | | | 702/122 |
| 2006/0003810 | A1 | * | 1/2006 | Saikyo .................. H04W 24/06 |
| | | | | 455/566 |
| 2006/0080626 | A1 | * | 4/2006 | Ohba ............. G01R 31/318357 |
| | | | | 716/108 |

(Continued)

FOREIGN PATENT DOCUMENTS

| EP | 1898555 A1 * | 3/2008 | ......... H04L 12/2697 |
| JP | 2017-098615 A | 6/2017 | |
| WO | WO-2020230241 A1 * | 11/2020 | .......... G06F 11/3688 |

OTHER PUBLICATIONS

R. T. N. V. S. Chappa, B. R. Jammu, M. Adimulam and M. Ayi, "VLSI implementation of LTSSM," 2017 International conference of Electronics, Communication and Aerospace Technology (ICECA), Coimbatore, India, 2017, pp. 129-134 (Year: 2017).*

(Continued)

*Primary Examiner* — Matthew M Kim
*Assistant Examiner* — Indranil Chowdhury
(74) *Attorney, Agent, or Firm* — Pearne & Gordon LLP (57) ABSTRACT

Provided herein are an error detection device and an error detection method to intuitively identify the reason for a handshake failure. An entire state transition flow including each state based on the communication standard and a state transition condition to be executed between states is displayed as a state transition setting screen, and an immediately preceding state in which the state transition fails and the failed state transition condition are highlighted on the state transition setting screen, when the handshake with the device under test ends.

8 Claims, 4 Drawing Sheets

(56) References Cited

U.S. PATENT DOCUMENTS

| | | | | |
|---|---|---|---|---|
| 2006/0277344 | A1* | 12/2006 | Yasui | G06F 1/3203 |
| | | | | 710/305 |
| 2007/0104228 | A1* | 5/2007 | Cohen | H04J 3/0691 |
| | | | | 370/518 |
| 2008/0235405 | A1* | 9/2008 | Sakaguchi | G06F 13/385 |
| | | | | 710/15 |
| 2013/0145212 | A1* | 6/2013 | Hsu | H04L 1/24 |
| | | | | 714/27 |
| 2019/0042380 | A1* | 2/2019 | Das Sharma | G06F 13/4295 |
| 2019/0219636 | A1* | 7/2019 | Ekman | H04L 1/00 |
| 2020/0226018 | A1* | 7/2020 | Das Sharma | G06F 11/10 |
| 2020/0379860 | A1* | 12/2020 | Zhou | G06F 11/3656 |
| 2021/0293883 | A1* | 9/2021 | Onuma | H04L 1/0061 |
| 2021/0302500 | A1* | 9/2021 | Onuma | G01R 31/3171 |
| 2022/0074987 | A1* | 3/2022 | Kidokoro | H04L 1/244 |
| 2022/0206934 | A1* | 6/2022 | Kirinuki | G06F 11/3696 |
| 2022/0398177 | A1* | 12/2022 | Sunayama | G06F 11/08 |
| 2023/0104150 | A1* | 4/2023 | Sunayama | G06F 11/27 |
| | | | | 714/30 |
| 2023/0324868 | A1* | 10/2023 | Igawa | G05B 19/042 |
| | | | | 700/12 |

OTHER PUBLICATIONS

K. Jha, A. B. Patil and D. S. Khurge, "Design and Verification of LTSSM in USB 3.0," 2018 Fourth International Conference on Computing Communication Control and Automation (ICCUBEA), Pune, India, 2018, pp. 1-4 (Year: 2018).*

* cited by examiner

FIG. 4

ERROR DETECTION DEVICE AND ERROR DETECTION METHOD USING A PATTERN SIGNAL

TECHNICAL FIELD

The present invention relates to an error detection device and an error detection method for transmitting a test signal of a known pattern to a device under test, in a state where the device under test is transitioned to a signal return state by handshake based on a communication standard of the device under test, and detecting an error in input data that is returned and received from the device under test in response to the transmission of the test signal.

BACKGROUND ART

For example, in the communication standards of High Speed Serial Bus such as PCI Express and Universal Serial Bus (USB), when testing a receiver as a device under test, a technique for executing handshake that transitions the receiver to a test-only signal return state (Loopback.Active), inputting a known pattern for testing, and checking the error rate of the returned signal is commonly used.

Incidentally, when the device under test transitions to the signal return state (Loopback.Active), a handshake type technique is known in which the signal of the device under test is analyzed, handshake based on the actual high-speed serial bus standard performed, and state transition is performed. As the handshake type technique, for example, as disclosed in Patent Document 1 below, a technique is known in which a training pattern generated by an instruction from a link state management unit is transmitted to the device under test, and the link state of Link Training & Status State Machine (LTSSM) of the device under test is transitioned to loopback.

This handshake type technique is convenient in displaying the log of the completed handshake, and a method for logging and displaying the time spent in each state during state transitions is common. Then, when the device under test being verified fails in state transition, the state in which the problem has occurred can be inferred from the information on this log.

RELATED ART DOCUMENT

Patent Document

[Patent Document 1] JP-A-2017-098615

DISCLOSURE OF THE INVENTION

Problem that the Invention is to Solve

However, in the method of displaying the log of the handshake described above, the state transition is repeated repeatedly when the handshake fails, so that there is a problem that the log becomes redundant and it is difficult to investigate the cause of the failure. Further, it is necessary to have a very deep understanding of communication standards, in order to analyze why the state transition fails and which state transition condition is not satisfied and the handshake fails, based on the log including a list of simple states and stay times. Moreover, in order to adjust the state transition condition in which the handshake fails, there is a problem that a deep understanding and experience of communication standards are required.

Therefore, the present invention has been made in view of the above problems, and an object of the present invention is to provide an error detection device and an error detection method that can intuitively identify the reason for a handshake failure.

Means for Solving the Problem

In order to achieve the above object, an error detection device according to claim 1 of the present invention is an error detection device 1 that transmits a test signal of a known pattern to a device under test W, in a state where the device under test is transitioned to a signal return state by handshake based on a communication standard of the device under test, and detects an error in input data that is returned and received from the device under test in response to the transmission of the test signal, the error detection device including:
   an operation display unit 6 that displays, as a state transition setting screen 11, an entire state transition flow including each state based on the communication standard and a state transition condition to be executed between states; and
   display control means 8a for controlling the operation display unit so as to highlight an immediately preceding state in which the state transition fails and the failed state transition condition, on the state transition setting screen, when the handshake with the device under test ends.

The error detection device according to claim 2 of the present invention is the error detection device according to claim 1, in which
   transition condition adjustment means 8b for automatically adjusting the failed state transition condition and an immediately preceding state transition condition in which the state transition fails within a predetermined set width.

The error detection device according to claim 3 of the present invention is the error detection device according to claim 2, in which
   "0" is input and set in the input box of the state transition condition (13A) of a transmission state or the state transition condition (13B) of a reception state.

The error detection device according to claim 4 of the present invention is the error detection device according to claim 2, in which
   a state transition condition (13D) that does not exist in the communication standard between states is able to be selected and set, on the state transition setting screen.

An error detection method described in claim 5 of the present invention is an error detection method for transmitting a test signal of a known pattern to a device under test W, in a state where the device under test is transitioned to a signal return state by a handshake based on a communication standard of the device under test, and detecting an error in input data that is returned and received from the device under test in response to the transmission of the test signal, the error detection method including:
   a step of displaying, as a state transition setting screen 11, an entire state transition flow including each state based on the communication standard and a state transition condition to be executed between states; and
   a step of highlighting an immediately preceding state in which state transition fails and the failed state transition condition, on the state transition setting screen, when the handshake with the device under test ends.

The error detection method according to claim 6 of the present invention is the error detection method according to claim 5, further includes
a step of automatically adjusting the failed state transition condition and an immediately preceding state transition condition in which the state transition fails within a predetermined set width.

The error detection method according to claim 7 of the present invention is the error detection method according to claim 6, in which
"0" is input and set in the input box of the state transition condition (13A) of the transmission state or the state transition condition (13B) of the reception state.

The error detection method according to claim 8 of the present invention is the error detection method according to claim 6, in which
a state transition condition (13D) that does not exist in the communication standard between states is able to be selected and set, on the state transition setting screen.

Advantage of the Invention

According to the present invention, it is possible to intuitively identify the reason for the handshake failure from the highlighted content. In addition, it is possible to automatically set a successful handshake without any special knowledge when the handshake fails, so that advanced debugging can be performed regardless of the user's level of understanding of the communication standard.

BEST MODE FOR CARRYING OUT THE INVENTION

Hereinafter, an embodiment for carrying out the present invention will be described in detail with reference to the attached drawings.

The present invention relates to an error detection device and an error detection method using a handshake type technique in which a device provided with a Link Training & Status State Machine (LTSSM) as a link state management mechanism that manages the link state, for example, in the communication standards for High Speed Serial Bus such as PCI Express, and USB is used as a device under test, and the device under test is transitioned to a signal return state (Loopback.Active) by handshake based on the communication standard of the device under test. Note that the LTSSM exists in the physical layer, and transitions based on the signal received by the physical layer.

Then, in the error detection device and the error detection method according to the present invention, a test signal having a known pattern is transmitted to the device under test during the measurement mode in which the transition is made to the signal return state (Loopback.Active), and bit errors in the input data that is returned and received from the device under test in response to the transmission of the test signal is detected.

The device under test W to be detected by the error detection device 1 of the present embodiment is equipped with an LTSSM (Wa) that manages the link state, is connected to the error detection device 1 via a test jig (not shown), during a training mode in which handshake based on the communication standard before error detection (before error measurement) is performed, and this connection is detected to start transmission of a Low Frequency Periodic Signaling (LFPS) signal.

Since the interface of the signal output unit of the error detection device 1 and the interface of the signal reception unit of the device under test W are different, a test jig (not shown) is used for conversion for matching these interfaces.

Figure 1:
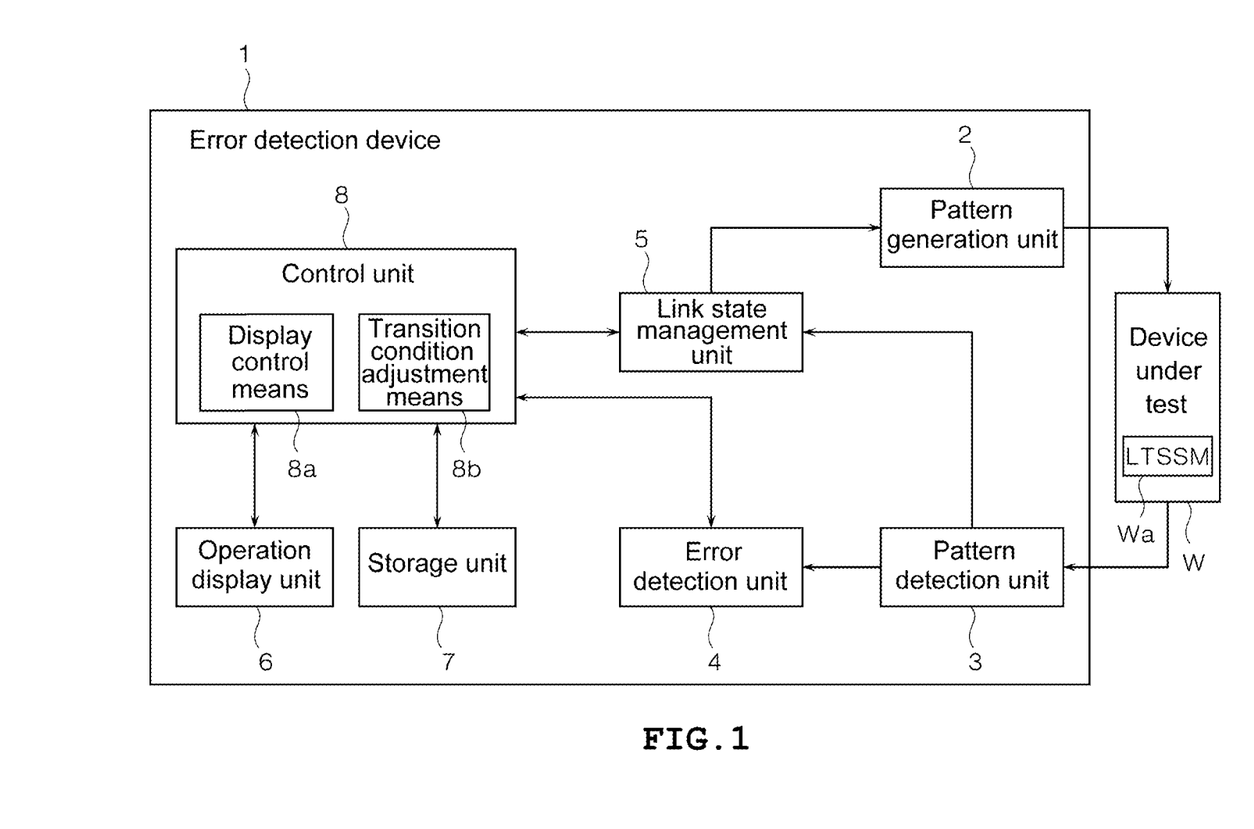
FIG. 1 is a block configuration diagram of an error detection device according to the present invention.

As shown in FIG. 1, the error detection device 1 of the present embodiment is generally configured to include a pattern generation unit 2, a pattern detection unit 3, an error detection unit 4, a link state management unit 5, an operation display unit 6, a storage unit 7, and a control unit 8.

The pattern generation unit 2 generates a pattern to be transmitted to the device under test W. During the training mode for transitioning the LTSSM (Wa) of the device under test W to the signal return state (Loopback. Active), the pattern generation unit 2 generates a training pattern signal corresponding to the link state of the LTSSM under the control by the control unit 8 via the link state management unit 5.

During the measurement mode in which a jitter tolerance test of the device under test W is performed in the state where the device under test W is transitioned to the signal return state (Loopback. Active), the pattern generation unit 2 generates a known pattern signal to be input to the device under test W, under the control by the control unit 8 via the link state management unit 5. The known pattern signal at this time is, for example, a pseudo-random binary signal sequence of Non Return to Zero (NRZ) signals of "0" and "1", and is a Compliance pattern (CP) of a pattern defined by the communication standard.

During the training mode, the pattern detection unit 3 detects the training pattern signal transmitted from the device under test W according to the state transition of the LTSSM (Wa) of the device under test W according to the handshake by the training pattern signal transmitted from the pattern generation unit 2.

When the pattern signal generated by the pattern generation unit 2 is input to the device under test W during the measurement mode in the state where the device under test W is transitioned to the signal return state (Loopback. Active), along with this, the pattern detection unit 3 detects the pattern signal that is returned from the device under test W to be input.

During the measurement mode, the error detection unit 4 detects the bit error by comparing a known pattern signal generated as a test signal by the pattern generation unit 2 and a pattern signal that is returned from the device under test W and detected by the pattern detection unit 3 in response to the transmission of the known pattern signal.

The link state management unit 5 includes an LTSSM having the same or equivalent mechanism as the LTSSM (Wa) mounted on the device under test W, and operates according to the communication standard of the I/O interface to be used (for example, USB3.2 Gen1, USB3.2 Gen2, or the like).

The link state management unit 5 causes the state of the link state to transition to the same state as the LTSSM (Wa) of the device under test W, based on the signals communicated with the device under test W, and can recognize the current link state of the LTSSM (Wa) in the device under test W. Thus, it is possible to obtain various types of information such as an LTSSM value, a link speed, presence or absence of loopback, an LTSSM transition pattern, a lane number for identifying the lane, a link number, a generation time and the number of generations of a pattern signal, an emphasis amount, and an adjustment value of an equalizer on the receiving side.

The operation display unit 6 is a user interface including a display unit such as a liquid crystal display, and an operation unit such as various keys, switches, buttons, and soft keys on the display screen of the display unit provided in the error detection device 1, and is operated when performing various settings and displays related to error detection.

Specifically, the operation display unit 6 displays a setting screen related to error detection, log information stored in the storage unit 7, and measurement results including error information detected by the error detection unit 15, under the control of the control unit 8 based on the operation of the operation unit.

Figure 2:
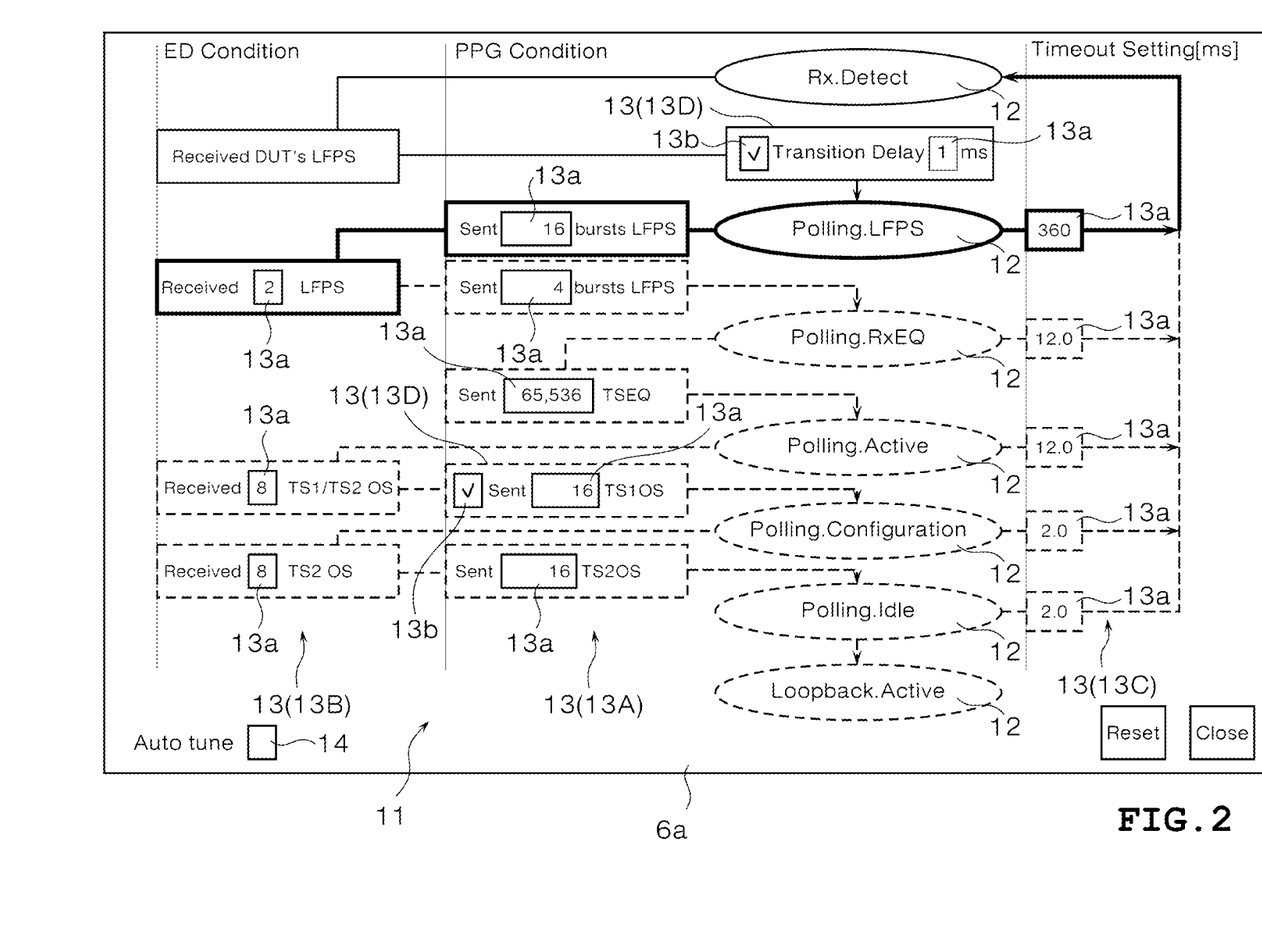
FIG. 2 is a diagram showing a state transition setting screen when handshake fails in a Polling.LFPS state, in the error detection device according to the present invention.
Figure 3:
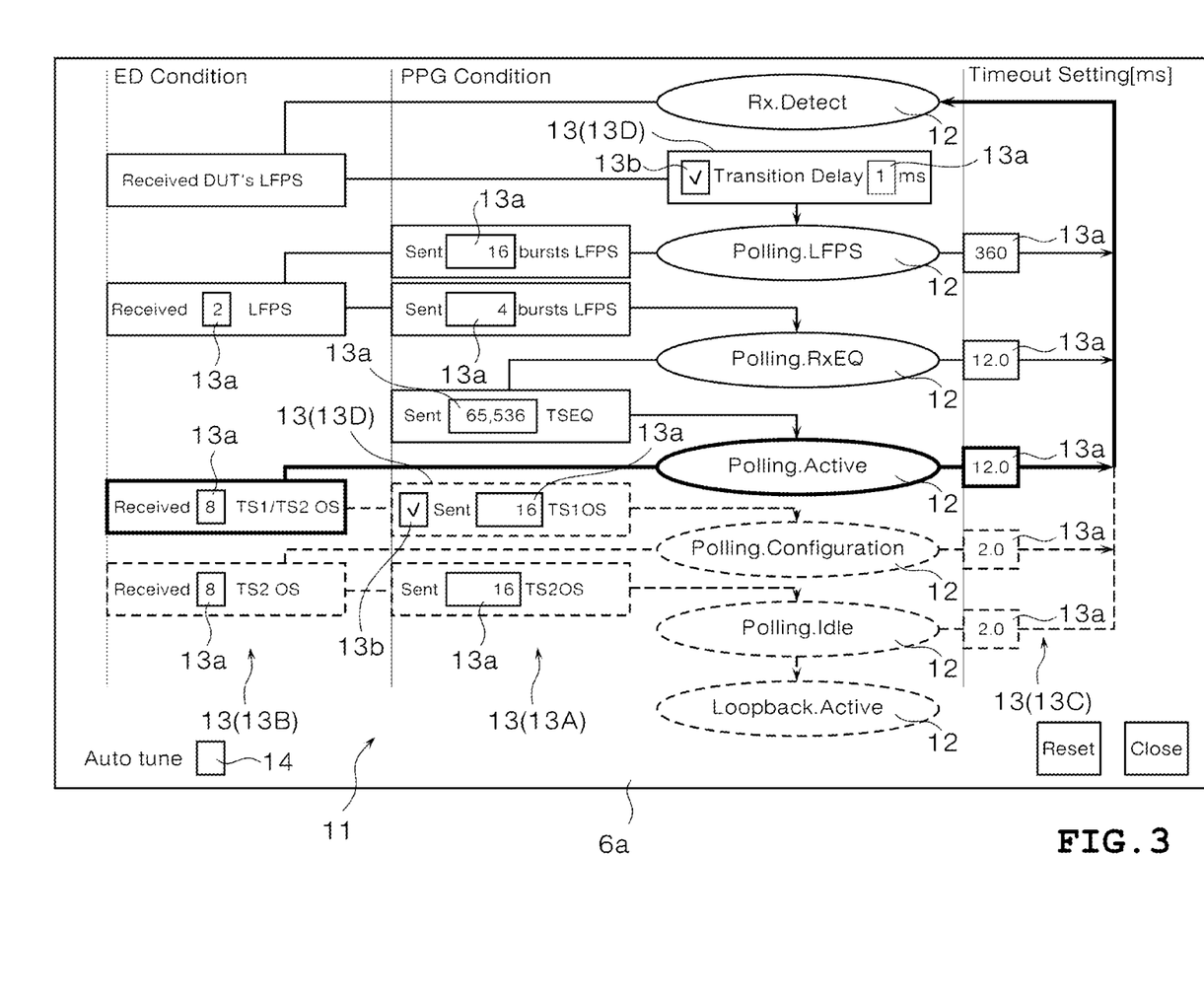
FIG. 3 is a diagram showing a state transition setting screen when handshake fails in a Polling.Active state, in the error detection device according to the present invention.
Figure 4:
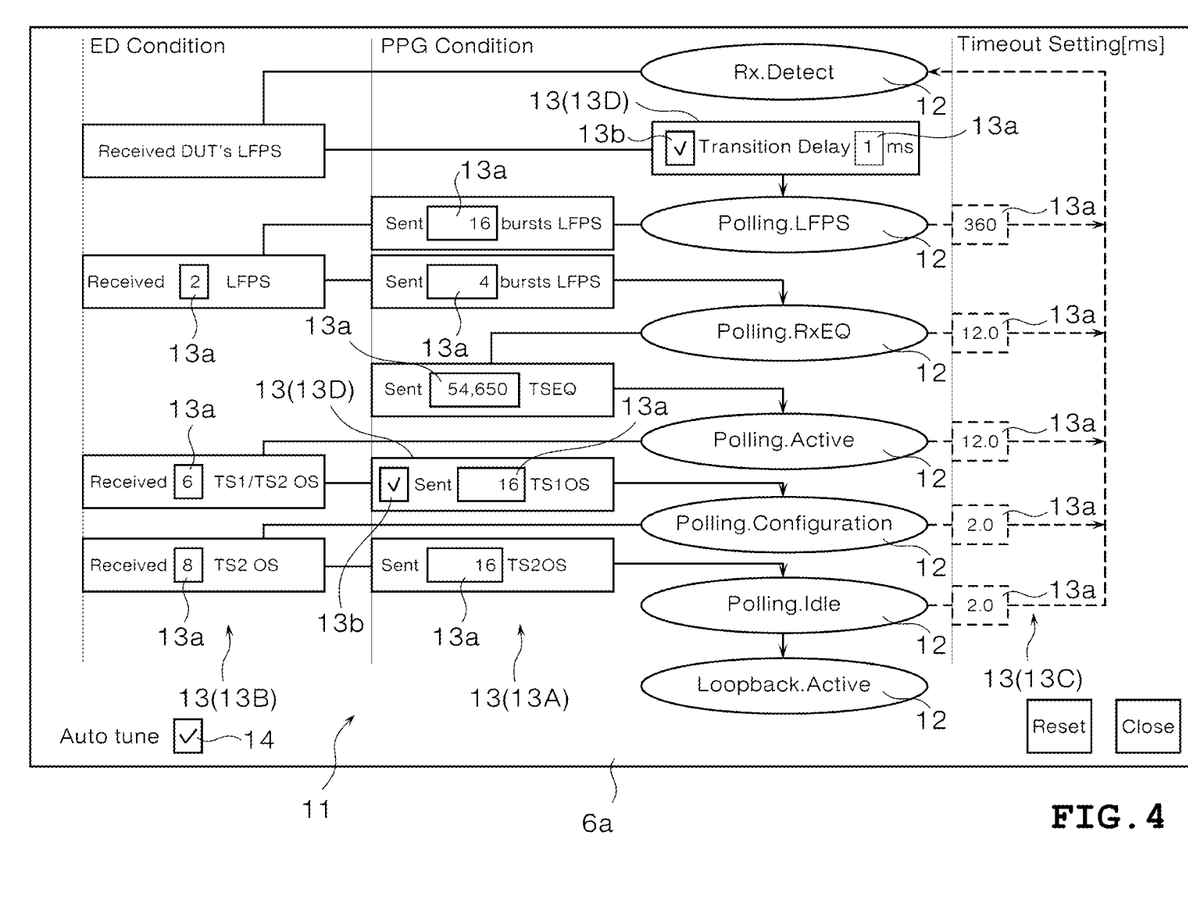
FIG. 4 is a diagram showing a state transition setting screen when the handshake succeeds by automatically adjusting the state transition condition when the handshake fails, in the error detection device according to the present invention.

In addition, the operation display unit 6 displays the state transition setting screen 11 in the display forms shown in FIGS. 2 to 4 on the display screen 6a, as a display related to the state transition due to handshake with the device under test W, under the control of the control unit 8 based on the operation of the operation unit.

The state transition setting screen 11 graphically displays, on the display screen, the entire state transition flow including each state (an elliptical portion displaying the name of each state) 12 based on the communication standard, and a state transition condition (a rectangular portion displaying the state transition condition) 13 executed between states.

For example, on the state transition setting screen 11 of FIG. 2, from the top to the bottom of the screen, each state 12 is displayed in the state transition order of "Rx. Detect"—"Polling. LFPS"→"Polling.RxEQ"→"Polling. Active"→"Polling. Configuration"→"Polling.Idle"→"Loopback.Active".

Further, on the state transition setting screen 11 of FIG. 2, the state transition condition 13A of the transmission state (PPG Condition) is displayed on the left side of each state 12 as the state transition condition 13 executed between states, the state transition condition 13B of the reception state (ED Condition) is displayed on the left side thereof, and the state transition condition 13C of Timeout Setting [ms] is displayed on the right side of each state 12.

Specifically, in the state transition setting screen 11 of FIG. 2, the state transition condition 13A of the transmission state corresponds to "Sent [16] bursts LFPS", "Sent [4] bursts LFPS", and "Sent [65,536] TSEQ", "Sent TS1 OS" and "Sent [16] TS2 OS". The state transition condition 13B of the reception state corresponds to "Received DUT's LFPS", "Received [2] LFPS", "Received [8] TS1/TS2 OS", and "Received [8] TS2 OS". The state transition condition 13C of the timeout setting corresponds to [360], [12.0], [12.0], [2.0], and [2.0] between each of "Polling.LFPS", "Polling.RxEQ", "Polling. Active", "Polling. Configuration", and "Polling.Idle" and "Rx.Detect".

[ ] of each of the state transition condition 13A of the transmission state, the state transition condition 13B of the reception state, and the state transition condition 13C of the timeout setting corresponds to the input box 13a described below, and the number in the [ ] indicates a value to be set and input in the input box 13a.

The state transition condition 13 (a state transition condition 13A of transmission state, a state transition condition 13B of reception state, and a state transition condition 13C of timeout setting) in FIG. 2 are configured such that variable input setting is possible with a predetermined adjustment width including a value defined by the communication standard for each input box 13a. Thus, it is possible to perform more detailed input settings without being limited to fixed values defined by the communication standards.

For example, on the state transition setting screen 11 of FIG. 2, the state transition condition 13B of the reception state: "Received [8] TS1/TS2 OS" means the condition of transitioning to the next state after receiving TS1 or TS2 eight times consecutively in a state of "Polling.Active", but the user can input and set, in the input box 13a, for example, any value within the range of "0 to 65535", including the value "8" currently input in the input box 13a as a value defined by the communication standard.

Further, when "0" is input and set in the input box 13a of the state transition condition 13A of the transmission state and the state transition condition 13B of the reception state, as 0 setting, it is possible to skip the state transition condition and transition to the next state transition condition or the next state. Thus, even when the handshake with the device under test W fails, the subsequent state transition conditions, including the failed state transition condition, are set to 0, so that it is possible to quickly make transition to "Loopback. Active" state.

When performing handshake with the device under test W, a value defined by the communication standard of the device under test W, or a value when handshake with the device under test W is finally performed is set as the initial value in the input box 13a of each state transition condition 13.

On the state transition setting screen 11, a state transition condition 13D that does not exist in the communication standard between states can be selected and set. For example, on the state transition setting screen 11 of FIGS. 2 and 3, in the state of "Polling.Active", the state transition condition 13A of the transmission state after receiving TS1 or TS2 eight times consecutively: "Sent [16] TS1 OS" corresponds to the state transition condition 13D that does not exist in the communication standard. A check box 13b is provided for the state transition condition 13D that does not exist in this communication standard, and switching between valid and invalid is performed depending on whether or not the check box 13b is checked. Thus, by setting and inputting a desired value in the input box 13a with the check box 13b of the state transition condition 13D that does not exist in the communication standard described above being checked, the time in the "Polling.Active" state can be extended, and timing adjustment can be performed.

Note that on the state transition setting screen 11 of FIGS. 2 to 4, "Transition Delay [1] ms" is added as the state transition condition 13D that does not exist in the communication standard between the state transition condition of a reception state: "Received DUT's LFPS" and the state: "Polling.LFPS", but the adding position is not limited thereto. The state transition condition 13D that does not exist in this communication standard can be appropriately added to a portion where there is a state whose timing is difficult to adjust for each communication standard.

Furthermore, when the handshake with the device under test W ends, the operation display unit 6 highlights the highest reached state and the failed state transition condition between the highest reached state and the immediately following state, under the control of the display control means 8a to be described later of the control unit 8, on the state transition setting screen 11 shown in FIGS. 2 and 3. Note that the highest reached state here refers to the immediately preceding state in which the state transition fails.

As a specific highlighting method, the highest reached state and the failed state transition condition between the highest reached state and the immediately following state at the end of the handshake are displayed in red for highlight, for example. On the other hand, reached states and a successful state transition condition are displayed in green, for example, and other unreached states and state transition conditions are displayed in gray, for example.

Here, FIG. 2 shows the state transition setting screen 11 when the handshake fails in the "Polling.LFPS" state, and FIG. 3 shows the state transition setting screen 11 when the handshake fails in the "Polling.Active" state.

On the state transition setting screen 11 shown in FIGS. 2 and 3, the highest reached state and the failed state transition condition between the highest reached state and the immediately following state at the end of the handshake are indicated by thick lines, the successful states at the end of the handshake and a state transition condition are indicated by thin lines, and other unreached states and state transition conditions are indicated by dotted lines.

On the state transition setting screen 11 of FIG. 2, as indicated by the thick line, the highest reached state at the end of the handshake is "Polling.LFPS", which indicates that in the state of "Polling.LFPS", the state transition condition of a reception state "Received [2] LFPS" cannot be satisfied, [360 ms] that is the state transition condition of timeout setting has passed, and the state has returned to "Rx.Detect".

That is, the state transition setting screen 11 of FIG. 2 shows that in the state of "Polling.LFPS", when LFPS is received consecutively two times, the state transition condition of a reception state is satisfied, after transmitting the LFPS sixteen times that is the state transition condition of a transmission state, the state can transition to the next "Polling.RxEQ" state, but the state transition condition of a reception state at this time could not be satisfied.

In the handshake failure example of FIG. 2, it can be inferred that there is a problem in the LFPS output of the device under test W. In this case, when the set value [2] input in the input box 13a of the state transition condition of a reception state: "Received [2] LFPS" is set to [0], the state transition condition of a reception state is ignored, and after transmitting LFPS sixteen times, it is possible to transition to the next state.

Further, on the state transition setting screen 11 of FIG. 3, as indicated by the thick line, the highest reached state at the end of the handshake is "Polling.Active", which indicates that in the state of "Polling.Active", the state transition condition of a reception state "Received [8] TS1/TS2 OS" cannot be satisfied, [12.0 ms] that is the state transition condition of timeout setting has passed, and the state has returned to "Rx.Detect".

That is, the state transition setting screen 11 of FIG. 3 shows that in the state of "Polling.Active", when TS1 or TS2 is received eight times consecutively, the state transition condition of a reception state is satisfied, after transmitting sixteen times the TS1 OS that is the state transition condition of a transmission state, the state can transition to the next "Polling.Configuration" state, but the state transition condition of a reception state at this time could not be satisfied.

In the handshake failure example of FIG. 3, it can be inferred that there is a problem with the timing or waveform quality of the TS1 or TS2 OS output of the device under test W.

Further, on the state transition setting screens 11 when the handshake fails in FIGS. 2 and 3, in actual link training, handshakes are repeated many times and failures are repeated, but the highest reached state and the failed state transition condition between the highest reached state and the immediately following state at the end of the handshake are highlighted. For example, even when the first handshake times out after transitioning to the "Polling.Active" state, and then the handshake ends by looping between the "Polling.LFPS" state and the "Rx.Detect" state, the highest reached state "Polling.Active" at the end of the handshake and the failed state transition condition between that state and the immediately following "Polling.Configuration" state are highlighted.

Further, in order to automatically adjust the state transition condition by the transition condition adjustment means 8b described later in the control unit 8, under the control of the control unit 8, as shown in FIGS. 2 to 4, the operation display unit 6 displays a check box 14 for automatic adjustment mode: "Auto tune" on the state transition setting screen 11, and the automatic adjustment mode is enabled or disabled depending on whether or not the check box 14 is checked.

Under the control of the control unit 8, the storage unit 7 stores, for example, the link state transition destination, transition occurrence time, transition trigger, error information, or the like, managed by the link state management unit 5, as log information according to the transition state of the LTSSM.

The control unit 8 integrally controls respective units (the link state management unit 5, the operation display unit 6, and the storage unit 7), when performing handshake with the device under test W and error detection.

Specifically, during the training mode, the control unit 8 instructs the pattern generation unit 2 via the link state management unit 5 to generate a training pattern signal to be generated next according to the current link state of the LTSSM of the link state management unit 5.

The control unit 8 also instructs the pattern generation unit 2 via the link state management unit 5 to generate a pattern signal, during the measurement mode.

Further, the control unit 8 includes display control means 8a and transition condition adjustment means 8b. The display control means 8a controls the reading of the log information corresponding to the transition state of the LTSSM of the link state management unit 5 and the detection result of the error detection unit 4, performs display control of the read log information and detection result to the operation display unit 6, and performs display control of the state transition setting screen 11 shown in FIGS. 2 to 4.

The transition condition adjustment means 8b determines the state transition condition in which the handshake fails based on the log information according to the transition state of the LTSSM of the link state management unit 5, and with the check box 14 of the automatic adjustment mode: "Auto tune" of the state transition setting screen 11 of FIGS. 2 to 4 checked, automatically adjusts the set value with a predetermined adjustment width (an adjustment width preset by the user, and an adjustment width starting from a value defined by the communication standard), with respect to the failed state transition condition and the immediately preceding state transition condition at the end of the handshake.

Specifically, the transition condition adjustment means 8b determines the state transition condition of a reception state: "Received [8] TS1/TS2 OS" and the state transition condition of a transmission state: "Sent [65, 536] TSEQ" as a failed state transition condition at the end of handshake, based on the log information on the link state management unit 5, in the handshake failure example of FIG. 3, automatically adjust the set value to be input in the input box 13a of the state transition condition of a reception state: "Received [8] TS1/TS2 OS" from [8] to finally [6], as shown in FIG. 4, and automatically adjust the set value to be input in the input box 13a of the immediately preceding state transition condition of a transmission state: "Sent [65, 536] TSEQ" [65, 536] to finally [54, 650], as shown in FIG. 4.

When the handshake is performed between the error detection device 1 and the device under test W configured as described above, the error detection device 1 and the device under test W are connected via a test jig (not shown).

When the connection to the error detection device 1 via the test jig is detected, the device under test W starts the transmission of the LFPS signal as a training pattern signal.

When receiving the LFPS signal transmitted from the device under test W, the error detection device 1 transitions to the Polling.LFPS state and starts transmitting the LFPS signal as a training pattern signal.

When the LFPS signal transmitted from the error detection device 1 is received, the device under test W transitions to the next state, and transmits a training pattern signal corresponding to the next state.

Then, when the handshake between the device under test W and the error detection device 1 is successful, the device under test W and the error detection device 1 transmit training pattern signals defined in each state to each other, the state transitions, and the LTSSM of the device under test W transitions to the Loopback.Active state for the final test.

When the handshake between the device under test W and the error detection device 1 ends, the display control means 8a of the control unit 8 controls the operation display unit 6 to graphically display the entire state transition flow including the state based on the communication standard and the state transition condition to be executed between states, on the state transition setting screen 11.

Then, when the handshake between the device under test W and the error detection device 1 fails and the transition to the Loopback.Active state is not made, as indicated by the thick lines in FIGS. 2 and 3, the highest reached state and the failed state transition condition between the highest reached state and the immediately following state are highlighted.

Further, when the check box 14 of the automatic adjustment mode: "Auto tune" on the state transition setting screen 11 is checked and the handshake is executed again, the transition condition adjustment means 8b of the control unit 8 automatically adjusts the set values of the failed state transition condition at the end of the previous handshake and the immediately preceding state transition condition with a predetermined adjustment width.

In addition, when the handshake between the device under test W and the error detection device 1 fails and transition to Loopback.Active state is not made, on the state transition setting screen 11 in FIG. 2 and FIG. 3, the value set in the input box 13a of the state transition condition 13 (state transition condition 13A of the transmission state, state transition condition 13B of the reception state, and state transition condition 13C for timeout setting) which may be the cause of the failure of the handshake may be adjusted and the handshake with the device under test W may be executed again.

Further, when there is a state whose timing is difficult to adjust depending on the communication standard, it is possible to check the check box 13b of the state transition condition 13D that does not exist in the communication standard, and set and input a desired value in the input box 13a.

Incidentally, in the above-described embodiment, as shown in FIG. 1, the error detection device 1 is configured to integrally include the pattern generation unit 2, the pattern detection unit 3, the error detection unit 4, the link state management unit 5, the operation display unit 6, the storage unit 7, and the control unit 8, but the present invention is not limited to this configuration. For example, the operation display unit 6 may be configured by an external device such as a personal computer connected to the outside, or the operation display unit 6 may be configured by separate modules for the operation unit and the display unit, or the pattern generation unit 2 and the pattern detection unit 3 can be separately modularized or made into individual housings.

As described above, according to the present embodiment, as a debug function different from the original handshake logging function, an entire state transition flow including each state based on the communication standard and a state transition condition 13 to be executed between states is displayed as a state transition setting screen 11 by graphical display, and a highest reached state and a failed state transition condition between the highest reached state and an immediately following state are highlighted on the state transition setting screen 11 when the handshake with the device under test W ends. This makes it possible to intuitively identify the reason for the handshake failure from the highlighted content.

Further, when the handshake is executed again in a state where the check box 14 of the automatic adjustment mode: "Auto tune" on the state transition setting screen 11 is checked, the transition condition adjustment means 8b of the control unit 8 automatically adjusts the set values of the failed state transition condition at the end of the previous handshake and the immediately preceding state transition condition with a predetermined adjustment width. This makes it possible to automatically set a successful handshake without any special knowledge when the handshake fails, so that advanced debugging can be performed regardless of the user's level of understanding of the communication standard.

Further, on the state transition setting screen 11, the value to be input in the input box 13a of the state transition condition 13 defined by the communication standard is not a fixed value but has an adjustment width. Further, the state transition condition 13D that does not exist in the communication standard can be selectively added by checking the check box 13b on the state transition setting screen 11. This makes it possible to implement a flexible and easy standard test that has the advantages of both the fixed-sequence type and the handshake type. As a result, the user can accurately grasp the tendency of the state transition and the characteristics of the failure of the device under test, and can perform smooth development and debugging.

Although the best form of the error detection device and the error detection method according to the present invention has been described above, the present invention is not limited by the description and drawings in this form. That is, it goes without saying that all other forms, examples, operational techniques, and the like made by those skilled in the art based on this form are included in the scope of the present invention.

DESCRIPTION OF REFERENCE NUMERALS AND SIGNS

1 Error detection device
2 Pattern generation unit
3 Pattern detection unit
4 Error detection unit
5 Link state management unit
6 Operation display unit
7 Storage unit
8 Control unit
8a Display control means
8b Transition condition adjustment means
11 State transition setting screen
12 State (state name)
13 State transition condition
13A State transition condition of transmission state
13B State transition condition of reception state
13C State transition condition of timeout setting
13D State transition condition that does not exist in communication standard
13a Input box
13b Checkbox
14 Checkbox
W Device under test
Wa LTSSM

What is claimed is:

1. An error detection device that transmits a test signal of a known pattern to a device under test, in a state where the device under test is transitioned to a signal return state by handshake based on a communication standard of the device under test, and detects an error in input data that is returned and received from the device under test in response to the transmission of the test signal, the error detection device comprising:
   an operation display configured to display, as a state transition setting screen, an entire state transition flow including each state based on the communication standard and a state transition condition to be executed between states; and
   display controller configured to control the operation display so as to highlight an immediately preceding state in which a state transition fails and a failed state transition condition, on the state transition setting screen, when the handshake with the device under test ends.

2. The error detection device according to claim 1, wherein the controller is further configured to automatically adjust the failed state transition condition and an immediately preceding state transition condition in which the state transition fails within a predetermined set width.

3. The error detection device according to claim 2, wherein "0" is input and set in an input box of a state transition condition of a transmission state or a state transition condition of a reception state.

4. The error detection device according to claim 2, wherein a state transition condition that does not exist in the communication standard between states is able to be selected and set, on the state transition setting screen.

5. An error detection method for transmitting a test signal of a known pattern to a device under test, in a state where the device under test is transitioned to a signal return state by handshake based on a communication standard of the device under test, and detecting an error in input data that is returned and received from the device under test in response to the transmission of the test signal, the error detection method comprising:
   a step of displaying, as a state transition setting screen, an entire state transition flow including each state based on the communication standard and a state transition condition to be executed between states; and
   a step of highlighting an immediately preceding state in which a state transition fails and a failed state transition condition, on the state transition setting screen, when the handshake with the device under test ends.

6. The error detection method according to claim 5, further comprising:
   a step of automatically adjusting the failed state transition condition and an immediately preceding state transition condition in which the state transition fails within a predetermined set width.

7. The error detection method according to claim 6, wherein "0" is input and set in an input box of a state transition condition of a transmission state or a state transition condition of a reception state.

8. The error detection method according to claim 6, wherein a state transition condition that does not exist in the communication standard between states is able to be selected and set, on the state transition setting screen.

* * * * *